(No Model.)
3 Sheets—Sheet 1.

D. H. FOX & T. P. KINSEY.
Ventilation of Railway Passenger Cars.

No. 238,777.   Patented March 15, 1881.

Witnesses
Frank P Kinsey
Frank Hartman

Inventors
David H Fox
Thomas P Kinsey
Per Thomas P Kinsey, Atty (No Model.)  3 Sheets—Sheet 2.
D. H. FOX & T. P. KINSEY.
Ventilation of Railway Passenger Cars.
No. 238,777. Patented March 15, 1881.
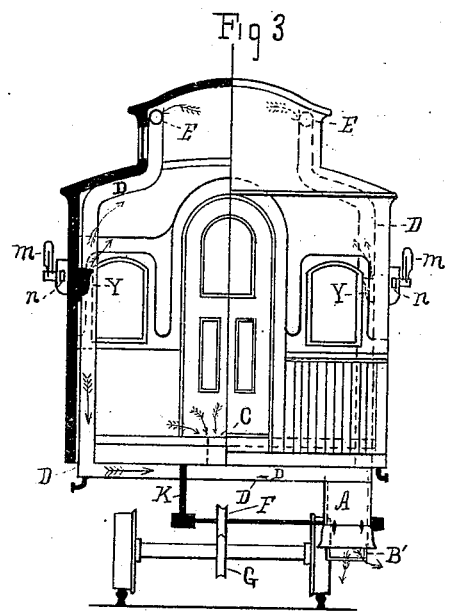
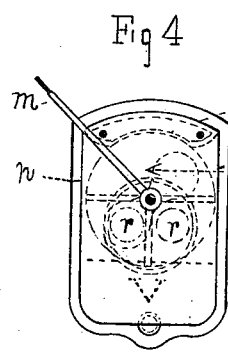
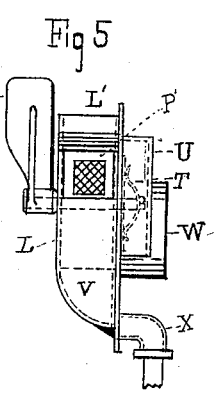
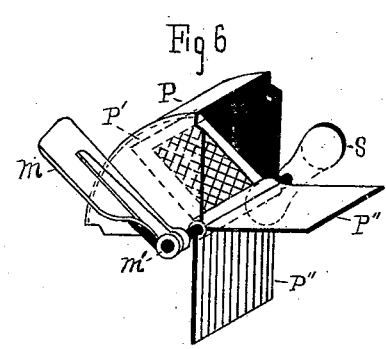
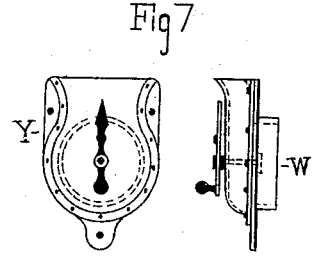
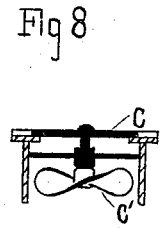
Witnesses
Frank P Kinsey
Frank Hartman
Inventors
David H Fox
Thomas P Kinsey
Per Thomas P Kinsey Atty (No Model.)
D. H. FOX & T. P. KINSEY.
Ventilation of Railway Passenger Cars.
No. 238,777. Patented March 15, 1881.
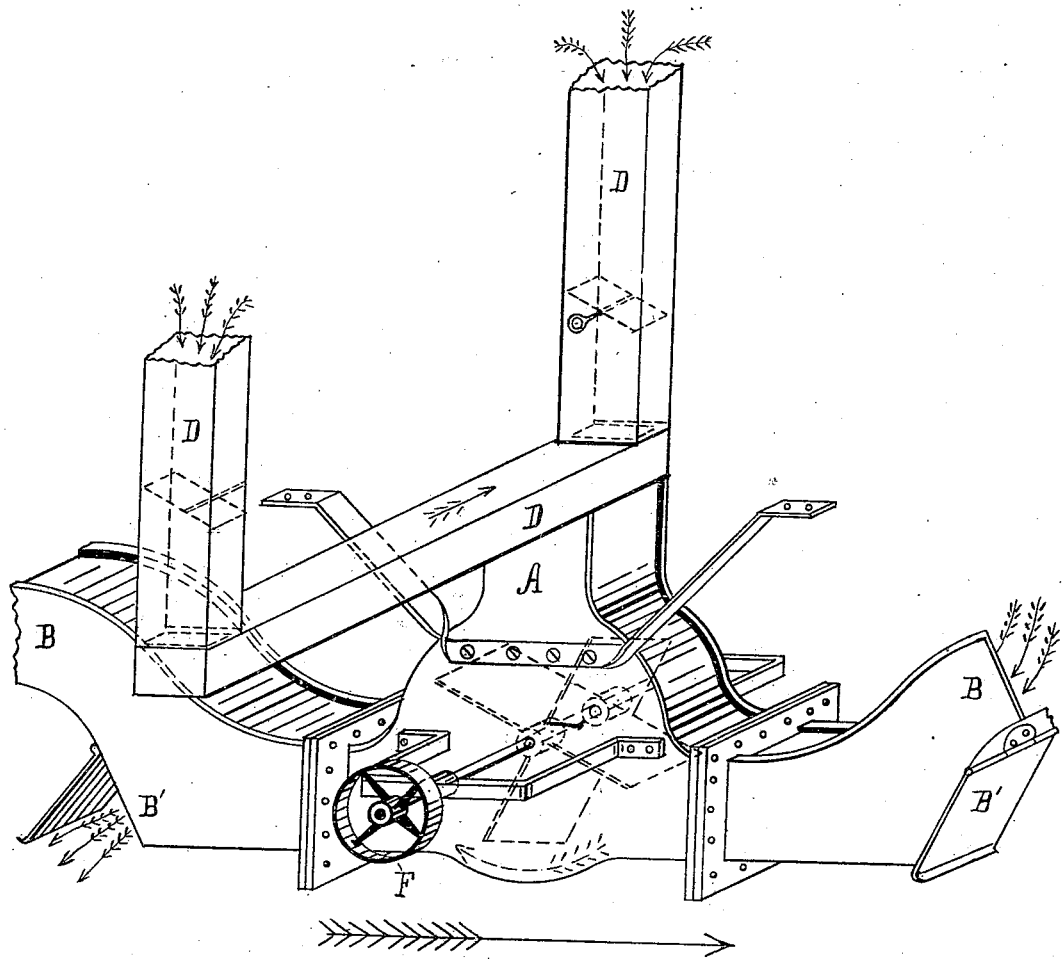
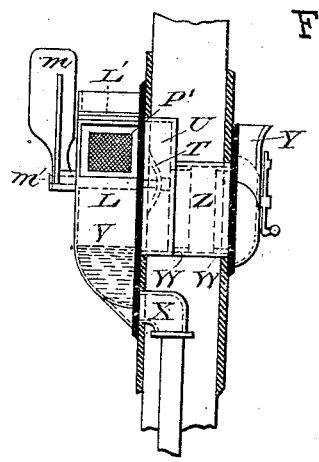
Witnesses
Frank P Kinsey
Frank Hartman
Inventors
David H Fox
Thomas P Kinsey
Per Thomas P Kinsey
Atty

UNITED STATES PATENT OFFICE.

DAVID H. FOX AND THOMAS P. KINSEY, OF READING, PENNSYLVANIA; SAID FOX ASSIGNOR TO SAID KINSEY.

VENTILATION OF RAILWAY PASSENGER-CARS.

SPECIFICATION forming part of Letters Patent No. 238,777, dated March 15, 1881.

Application filed May 3, 1880. (No model.)

*To all whom it may concern:*

Be it known that we, DAVID H. FOX and THOMAS P. KINSEY, both of the city of Reading, county of Berks, State of Pennsylvania, have invented a new and useful Improvement in the Ventilation of Railway Passenger-Cars, of which the following is a specification.

This improvement is more particularly related to the Patent No. 12,818, 1855—improvement in ventilators for railroad-cars—granted to the above David H. Fox and to John Fink, both of the city of Reading, Pennsylvania; and it consists in a change in the form and application of the fan, by which it becomes both a blower and exhauster at one and the same time, and works equally as well in either direction. In the same connection we have modified the arrangement of the pipes, and instead of blowing the air into the car from registers in the floor it is exhausted from the lower part of the car through the registers, and from the highest part of the car through the perforated pipes provided for that purpose, the fresh air being provided by the effect of gravity alone, which air is passed through special automatic water-reservoir boxes or cases placed between the windows and in the casing of the car.

Figure 1:
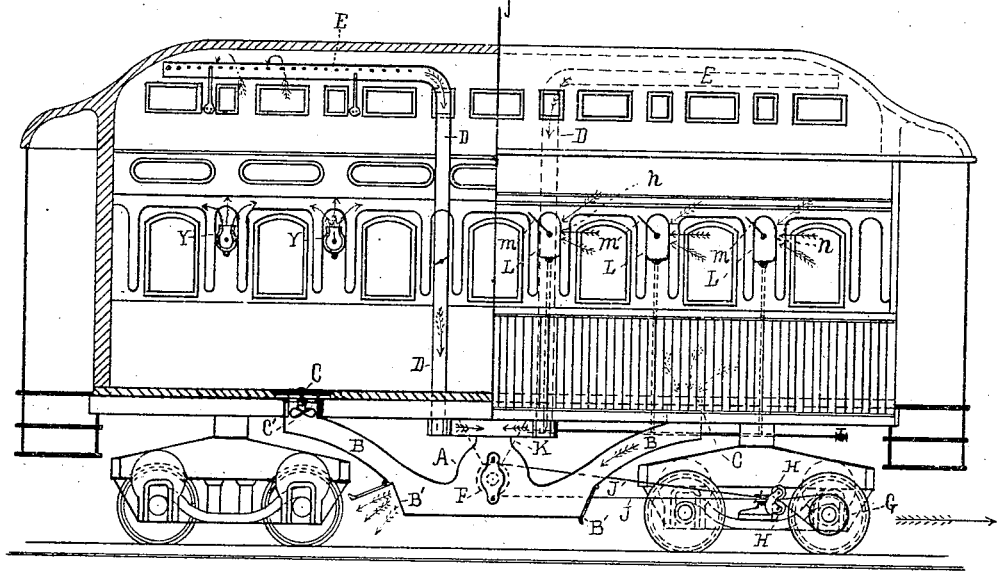
Figure 2:
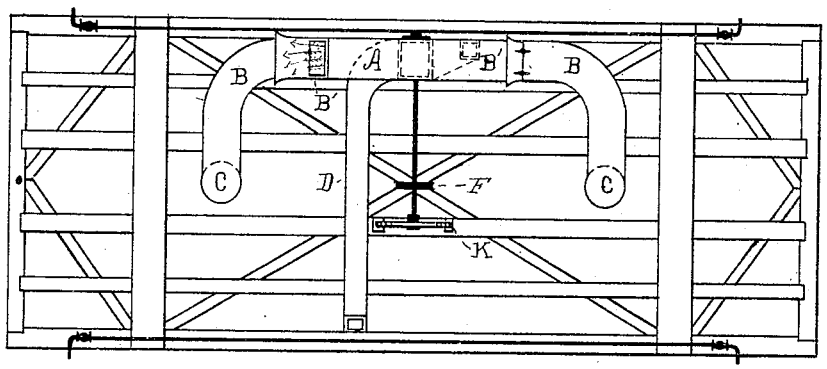

Figure 1 is a side elevation, partly in section, of a passenger-car with the improvements attached; Fig. 2, a reverse plan of the car; Fig. 3, an end elevation of the car; Fig. 4, enlarged front elevation of air-duct; Fig. 5, enlarged side elevation of air-duct; Fig. 6, detail of air-duct governor; Fig. 7, front and side elevation of air-register; Fig. 8, section of floor-register. Fig. 9 is a perspective elevation of the triple-mouthed fan separated from the car, but having the blast and exhaust boxes attached. Fig. 10, Sheet 3, is a section of a portion of the side of a passenger-car, showing the connection between the air-duct box L and the register Y by the collars W and pipe Z.

Similar letters in all the drawings refer to similar parts.

A represents the triple-mouth fan; B B, exhaust-pipes connected to the fan, and through which is drawn the air overloaded with carbonic oxide, settling near the floor; B' B', discharge-pipes automatically closed and opened to suit the direction in which the car may be moving; C, registers in the floor of the car controlled by the fan A, and through which the lower stratum of foul air is removed; D D, exhaust-pipes leading from fan A up the sides of the car to the ceiling, and placed so as to withdraw through the longitudinally-connected pipes the warm foul air collected in the upper portion of the car; E, longitudinal pipes connected with the vertical pipes D. These pipes extend in opposite directions from each vertical pipe for one-half of the length of car-top, and are perforated on the upper surface for ingress of foul or heated air.

F is a driving pulley or sheave for either a belt or wire rope, by which motion is given to the fan-shaft; G, driving pulley or sheave on the axle of the truck; H, universal belt or wire-rope guide; J', belt or wire-rope driving-band; K, hanger supporting the outer end of the fan-shaft. The fan-case is secured to the bottom of the car in a firm and substantial manner, its position being governed by the facilities afforded for its application.

L is an automatic fresh-air duct, box, or case, placed in the panel between the windows of the car (when applied to passenger-cars.)

L' is a loose hood-piece, having its under surface curved or arched, and which is secured in place after the triple-winged duct and air-governor is put upon the shaft $m'$.

$n$ are fore and aft openings into the case.

$m$ is a fan or vane arm secured to the shaft $m'$ in a position coincident with the upper wing of the triple-winged governor. At the opposite end of the shaft $m'$ is a double-disk valve, S, kept in contact with either of the air-openings $r\ r$ in the back of the case L by the spring T or an equivalent device.

The triple-winged governor P is composed of a hub with three wings cast or secured to the same, the upper wing, P', being a frame covered by a wire screen having a circumferential cap concentric with the arc of the hood L' and segmental sides equally placed each side of the wing. The two opposite wings, P'', are plain metal disks set at equal angles with the upper wing, P', and so arranged that when the upper wing, P', is in position to intercept the air entering from either end of the case L one of the wings P″ shall be in a horizontal plane, closing the top of the water-reservoir on the air-entering side, while the other wing P″ shall be in a vertical position, forming, in combination with the central ribs in the water-reservoir, a diaphragm or partition partially immersed in the water contained in the same.

U is an air-reservoir on the back of the case.

V is a water-reservoir in the box or case L.

W is a collar for the pipe-connection between the exterior case, L, and the fresh-air register Y in the interior of the car.

X is the hub for attachment of the pipe by which all the connected cases are supplied with water or emptied thereof at one and the same time.

Y is a lipped-case air-register for regulating the flow of fresh air into the car, and is of the ordinary pattern, provided with a solid disk front, set so as to leave a space between the disk and front proper of the register, this space being (except at the top) closed. The aperture at the top is so shaped as to discharge the air toward the top and center of the car. Being thus diffused, it will not descend upon the heads of the passengers in streams, nor create annoying cross-drafts.

The action of the air-duct-boxes is as follows: When the car is in motion the induced currents of air (and when standing still the movement of the air by atmospheric disturbances) strike or impinge upon the arm or vane $m$, which, with the triple-winged governor P and double-disk valve S, is secured to the shaft $m'$, and any motion imparted to the arm $m$ is thus transferred to governor P and valve S. The governor being in position to receive the entering air, it is stripped of cinders by the screen in the wing P′, and then deflected by the cap to the water-reservoir below. The same movement having closed the valve opening under the screen and opened the one on the opposite side of the wing P″, (which is now a partition dividing the box into two parts, with its lower edge immersed in the water,) the air entering through the screen must (like gas in a meter) pass down under the wing P″ and through the water, rising and passing into the air-reservoir U through the opening $r$, and, if the register Y is open, into the car.

The tripled-mouth fan-case may be constructed of wood with a sheet-iron periphery, or it may be of cast metal throughout. The blades may be four or more in number, and are plain flat disks, secured in the usual manner to arms keyed on the shaft, and revolve concentric with the periphery of the fan. The shaft or spindle extends through the case, and is supported in spiders or boxes connected with the same, and is driven by belt or wire rope through a pulley or sheave keyed to the shaft. We form the case with two horizontal mouths, the lower edges of which are either tangential to the periphery of the case or slightly elevated above it at right angles with the horizontal openings and central to the fan. We place the third mouth at the top of the case, as clearly shown in Fig. 9. Connection is made with the alternative blast and exhaust boxes by bolted flanges or an equivalent. Therefore, should it for any purpose prove desirable, additional exhausting facilities may be obtained by openings in the sides of the case and connections made therewith. We give preference to the plan as described. The top mouth is at all times an exhausting one, while the horizontal openings are alternately discharging or exhausting openings, governed in their functions by the direction in which the car is being drawn or propelled.

In connection with the floor-registers, and to make the operation of the ventilator as a whole automatic, we connect to the pin of the movable plate or cut-off suspended in the boxes B B a spiral-winged propeller, which shall by its partial rotation, caused by the blast or suction of the fan A, close or open the registers; or, as an alternative device, we may insert in each blast or suction pipe B B an eccentric balanced-disk valve, which shall, upon the change of the motion of the air-current, either open or close the passage to the floor-register. This will leave the control of the floor-register to the occupants of the car.

The operation of our improvement in car-ventilation is as follows: From the description of the various parts comprising our mode of ventilation it will be noted that all are more or less automatic in their movements, and (with the exception of the air-ducts, which have besides an independent movement) are contingent on the movement of the car for their automatic action. The fan-shaft has keyed upon it a pulley or sheave, (preferably the latter,) and derives its motion through a belt or wire rope from a pulley or sheave on the axles of a pair of wheels under the car-truck. Simultaneously with the starting of the car is the movement of the fan-blades, which revolve in the same direction with the wheels of the car, a reversal of the motion of which causes a corresponding reversal of the fan-blade movement. The car being started in the direction of the horizontal arrow, Figs. 1 and 9, the door suspended before the forward horizontal mouth of the fan is closed by the pressure of air occasioned by the speed of the car, supplemented also by the suction produced in the fan-case by the revolution of the fan-blades. At the same time, and concurrent with the closing of the forward door B′, the rear door B′ is opened, and the exhaust action in the forward pipe B has opened the communication with the forward register in the floor, while the driving-blast has closed the communication with the rear floor-register. The exhaustion of the case has also started a down current from the top of the car through the horizontal perforated pipes E and their boxes D D connecting with the vertical mouth of the fan. As we prefer arranging it, the register is automatically closed and opened; but we have described a device by which a passage to the registers would be automatically closed and opened while the registers are under the control of the conductor. The foul and heated air drawn from the car through the perforated pipes E and the forward register is discharged from the rear horizontal mouth of the fan. The above-described operation, if continued, would create a vacuum in the car. To prevent this, and to furnish a full and continuous supply of fresh air to take the place of that exhausted, we apply to the exterior sides of the car the air-duct boxes L, which are so constructed and arranged (being fully described in the specification) that the starting of the car in either direction will, by the action of air-currents induced thereby, cause the governor-arm $m$ to oscillate upon its shaft, and thus cause the governor-screened wing P' to assume the proper position to receive the air-current, strip it of cinders, and deflect it through the water-reservoir, pass it by the connecting-pipe Z from the air-duct case through the lipped register Y into the car. The control of these registers is preferably left in charge of the conductor, and the admission of air can be graduated to suit any speed which may be given to the train. The action of the fresh-air registers might be made automatic by an electrical attachment to a thermometer, and the temperature thus adjusted remain uniform. The floor-registers might also be so arranged with an air-pump connection that an increased speed of the train would gradually reduce the opening of the same, and thus practically keep the exhaustion of the car at a uniform rate. The vertical exhaustion-pipes D D have valves, by which the removal of the heated air from the top of the car is under the control of the conductor. We find that a screen of two and three-fourths by three and one-eighth inches in the governor-arm will, at a car speed of fifteen miles per hour, pass through the box and lipped register into the car seventy-eight cubic feet of air per minute. The fan we prefer to use, of thirty inches diameter, will at the same car speed give two hundred and ten revolutions per minute, the mouths being eight by nine inches. With the above speed and dimensions the fan will exhaust eight hundred and twenty-four cubic feet per minute from the car, which will make the minimum supply of fresh air per passenger, for an eighty-feet car, equal to ten cubic feet per minute. By dividing the exhausting capacity of the fan by the quantity of air passed through one governor-screen, the result will indicate the minimum number of air-duct boxes to be applied to the car. To make allowance for derangement, cinders, obstructions, &c., we multiply the result by two, which insures a practical equalization of the entering and discharging currents at all speeds of the train.

We are aware that exhausting fans and blowers, together with suction and discharge boxes and perforated pipes, are old, and necessarily follow the use of blowing or exhausting apparatus for the ventilation of cars, (see Patents No. 147,843, A. W. Gates, February 24, 1874; No. 173,003, E. E. Hargraves, February 1, 1876, and No. 186,012, J. S. Linsley, January 9, 1877.) We do not therefore broadly lay claim to the same; but we do claim the arrangement and details of the apparatus as embodied in the specification, drawings, and claims herewith for the purposes of car-ventilation.

Having described our invention and its mode of application, what we claim, and desire to secure by Letters Patent, is—

1. The triple-mouthed fan A, without side openings in the case, in combination with passenger or other cars and the alternative exhausting and discharging boxes B B, with the self-acting doors B' B' beneath the car-floor and the exhaust-boxes D D at the sides of the car, the fan-shaft being driven by suitable machinery, or by the intervention of a belt or wire rope from the axle of one of the car-trucks, substantially as shown, and for the purpose described.

2. The alternative blast or exhaust boxes B B, with the automatic doors B' B', in combination with the registers C in the floor of passenger or other cars, and with the triple-mouthed fan A, for the purpose specified, and substantially as shown.

3. The longitudinal perforated exhausting-pipes E in the monitor top of the car, in combination with the triple-mouthed fan A, with its boxes B B, and the vertical exhausting-boxes D D, whereby a simultaneous exhaustion of foul or heated air from the ceiling and floor of the car is produced by the working of the fan, substantially as described, and for the purpose set forth.

4. The combination, with the movable plate of a car-floor register, C, securely fixed to and moving with the pin thereof, of a spiral arm or arms, C', suspended underneath the same in the alternative blast and exhaust boxes B B, and automatically operating the register-plate by the alternate blast or exhaust current in the boxes B B, derived from the triple-mouthed fan A, substantially as specified.

5. The automatic air-duct box or case L, with its governor P and water-reservoir V, on the exterior of the car, in combination with air-reservoir U, connecting-collar W, pipe Z, and register Y, the latter in the interior of the car, the whole operated by the exhaustion of the air from the interior of the car, substantially as shown, and for the purpose described.

6. The combination, with the air-duct case L, of the triple-winged governor P, the wing P' being an open frame covered with a wire screen and provided with a circumferential cap concentric with the under arc of hood L', having return segmental sides equally spaced at each side of the wing P', the opposite wings P'' P'' being plain metal disks set at equal angles with relation to the wing P', mounted on shaft $m'$, and provided with vane-arm $m$, whereby, through the traverse motion of the car upon the rails or the impact of wind against the vane $m$, the governor P is automatically tilted so as to open the air-duct box L in the direction of the impinging air-currents and deflect them into the water-reservoir V beneath, substantially as shown, and for the purpose described.

7. The combination of the double-disk valve S, spring T, and air-reservoir U with openings r r of the case L, governor-shaft m', and vane-arm m, for automatically directing the flow of air from the water-reservoir V into the air-reservoir U, whence, by lipped air-register Y, it is passed into the car, substantially as described and shown, for the purpose set forth.

8. The water-reservoir V in the base of case L, in combination with the wings P'' P'' of the governor P, which alternatively form a cover to the water-reservoir on the air-entering side and a partition across the same, having a connection with the air-reservoir U by the openings r r and double-disk valve S, as shown, and for the purpose substantially as described.

9. The vane-arm m, in combination with the shaft m', triple-winged governor P, double-disk valve S, spring T, and case L, automatically controlling the admission of air to the air-duct box or case L, as described, and for the purpose specified.

10. The lipped air-register Y, secured vertically to the inside lining of the car, and so arranged with a close cover that all the air passing the register-plate shall be discharged vertically through a rectangular curved throat with rounded lip, the curvature being so adjusted with relation to the width of the car and the space between the registers that the air shall be deflected upward and diffused toward the center of the car and the spaces between the registers on the sides, in combination with the air-duct box L outside of the car, and connecting-collars W W, and pipe Z, as shown, and for the purpose described.

DAVID H. FOX.
THOMAS P. KINSEY.

Witnesses:
JAMES R. KENNEY,
WALTER L. GOODHART.

It is hereby certified that Letters Patent No. 238,777, issued March 15, 1881, for an improvement in "The Ventilation of Railway Passenger Cars," upon the application of David H. Fox and Thomas P. Kinsey, were improperly granted to Thomas P. Kinsey as sole owner; whereas, it appears by the assignments upon record in this Office that said Kinsey was assignee of one-fourth only of said Fox's interest, and that said Letters Patent should have been granted to said David H. Fox jointly with said Thomas P. Kinsey; that the proper corrections have been made in the files and records of the Patent Office, and are hereby made in said Letters Patent.

Signed, countersigned, and sealed this 26th day of March, A. D. 1881.

[SEAL.]

A. BELL,
*Acting Secretary of the Interior.*

Countersigned:
E. M. MARBLE,
*Commissioner of Patents.*